United States Patent [19]

Thijssen et al.

[11] Patent Number: 5,477,168
[45] Date of Patent: Dec. 19, 1995

[54] FINITE STATE MACHINE WITH MEANS FOR THE REDUCTION OF NOISE EFFECTS

[75] Inventors: Aloysius P. Thijssen, Pijnacker; Franciscus G. M. Bouwman; Hendrik A. Vink, both of Eindhoven, all of Netherlands

[73] Assignee: U.S. Philips Corporation, New York, N.Y.

[21] Appl. No.: 219,060

[22] Filed: Mar. 29, 1994

[30] Foreign Application Priority Data

Mar. 30, 1993 [EP] European Pat. Off. ............. 93200897

[51] Int. Cl.$^6$ ................................................. H03K 19/173
[52] U.S. Cl. ................................ 326/46; 326/40; 371/69.1
[58] Field of Search .......................... 326/40, 46; 371/69.1

[56] References Cited

U.S. PATENT DOCUMENTS

| | | | |
|---|---|---|---|
| 4,438,350 | 3/1984 | Shepter | 307/440 |
| 4,455,652 | 6/1984 | Van Der Muelen | 371/16 |
| 5,015,886 | 5/1991 | Choi et al. | 307/465 |
| 5,097,151 | 3/1992 | Eerenstein | 307/465 |
| 5,206,547 | 4/1993 | Houghton | 307/465 |

OTHER PUBLICATIONS

Altera Corp., Application Note 22, Designing with AHDL., Apr. 1992, ver. 2, pp. 87–116.

Primary Examiner—Edward P. Westin
Assistant Examiner—Andrew Sanders
Attorney, Agent, or Firm—Anne E. Barschall

[57] ABSTRACT

A finite state machine that may receive actuator signals and has a plurality of elementary sequential logic elements fed by the actuator signals. Through various interconnections between the elements a first set of interconnected logic states is realized that are activated through combined occurrence of a particular predecessor state and an associated actuator signal. In various ones of said logic states a particular output signal is produced. Furthermore, the finite state machine has a subset of redundant logic states that are aggregated together with a particular operational by appropriate interconnections for collectively emulating the operational state in question.

12 Claims, 3 Drawing Sheets

FINITE STATE MACHINE WITH MEANS FOR THE REDUCTION OF NOISE EFFECTS

FIELD OF THE INVENTION

The invention relates to a finite state machine, comprising:

actuator signal input means;

a plurality of sequential logic elements fed by said actuator signal input means and through various interconnections between said elements realizing a first set of interconnected logic states, each respective logic state being selectively activated through combined occurrence of a particular predecessor state and an associated actuator signal received;

output signal means fed by said logic elements for under control of each member of at least a first subset of said logic states outputting an output signal privy to said each member;

and wherein said finite state machine furthermore has at least one second subset of logic states.

In principle, any piece of sequential logic can be considered as such a finite state machine. Applications are therefore in realizing control functions as well as data processing functions.

Such finite state machines have been realized at various technological levels and have been used in various applications. The term -finite- relates to the finite number of states. A particular use is for test control purposes on an integrated circuit chip or on a higher level of testing, such as a printed circuit board. The actuator signal or signals often is a recurrent signal, that may have one or more phases. Another representation is by a set of various distinct control signals receivable from elsewhere. Also, if a clock signal, it may be combined with one or more condition signals. The output may be a single control and/or data signal, or a whole range of such signals. The logic elements are usually binary, but this is not an express limitation, inasmuch as an element could be as well ternary, quaternary, etcetera. If binary, the total number of states is a power of two. However, the total number of states necessary for specifying the function of the finite state machine, the first subset of states, is usually not a power of two, which means that there are other states, a second subset of states, that in principle are superfluous for the originally intended functionality. In consequence, these other states are redundant. However, such redundant state could be entered through some accidental event, such as by power on, through some external interference, soft error, or other cause. It is a problem that reverting to normal operation would not be ensured automatically.

SUMMARY TO THE INVENTION

Accordingly, amongst other things it is an object of the present invention to provide a finite state machine according to the preamble, wherein the superfluous states would automatically and quickly exit to the first subset, while keeping design complexity low, so that the machine could no longer remain stalled in one or more of the redundant states or remain cycling through a plurality of such redundant states, upon occurrence of such accidental event.

Now, according to one of its aspects, the invention is characterized in that said machine has noise effect reduction means in that the various states of such at least one second subset are aggregated together with a particular state of said first subset privy to said at least one second subset as mutually equivalent states for by interconnections between all states of said second subset and said particular state collectively emulating said particular state within said first subset. It has been found that this allows to minimize the number of interconnections and circuit elements in a great spectrum of applications. As state of the art applicant has considered U.S. Pat. No. 4,455,652 to assigned to the same assignee, wherein the various states are each represented by an associated memory address. Upon arrival at a memory address corresponding to a redundant state, the finite state machine through an appropriate check lets the machine go back to a single initial state. Applicant has found that such procedure, although intrinsically correct, needs a lot of hardware. Especially for small, finite state machines that occur in multiple instances in a higher level system this represents an unwanted overhead. This means that the next-state equations for bringing the sequential logic elements into the next state would need additional product logic terms. Moreover, the return to the normal states is through the reset state which costs more time. The collective emulation according to the present invention then is very cost-effective. The number of second subsets may be equal to one. However, another solution is that a plurality of such second subsets exists, each equivalent to a respective single state of the first subset. Two states are equivalent if no logical input/output experiment on these states exist for providing a discrimination therebetween. In certain circumstances the use of plural second subsets could be superior in that less circuitry were required through simpler form and smaller number of the logic product terms. It is noted that various ones of the states of the first subset could be mutually equivalent as well, for some organizational reason.

Advantageously, with respect to at least one said second subset its various states are equivalent with a reset state. This is a very useful solution that will not produce a state that by itself would not be justified. By itself, the notion of a reset state is a conventional one.

Advantageously, with respect to at least one said second subset its various states have been encoded with an adjacent state assignment to one or more states in the first subset. This renders the solution simple and straightforward on a hardware level.

Advantageously, with respect to at least one said second subset its various states and said particular state are privy to the latter subset. This gives rise to the chaining mechanism, to be described in detail hereinafter. Such allows to also test the correct functionality of the redundant states. Inasmuch as the particular state is testable, also the —second— subset of states is testable, and as a consequence, the whole finite state machine. As will be explained hereinafter, an advantageous realization is that the particular state of the first set is the reset state, and the chain of redundant states is traversed through repeated actuation of the reset signal, or another activation signal or other input signal combination. An advantageous realization is through the joining of all respective redundant states into a single second subset.

Advantageously, the states of said first subset are encoded according to a code with error protection, and with respect to at least one said second subset detection means are provided for detecting occurrence of any of the various states of the latter subset. In principle, noise may produce an arbitrary state transition. If the Hamming distance between the states of the first subset is equal to one, such spurious transition within the first subset will not always be detected as erroneous (only so if the combination of origin state and destination state would not correspond to the actuator signal in question). The entering of a second subset will now always be signalled if noise causes a transition that does not comply with the code requirements. The error protection may be detection or correction, according to necessity.

Advantageously, the finite state machine is executed as a controller part of a digital integrated circuit for realizing said output signals as control signals. In particular for application in an electronic integrated circuit, the miniaturization and simplicity offered by the invention are a great advantage. Often, a single integrated circuit may house an appreciable plurality of finite state machines for executing data processing and/or control functions.

BRIEF DESCRIPTION OF THE FIGURES

These and other aspects of the invention will be elucidated with respect to the appended figures that show preferred embodiments, and in particular.

DETAILED DESCRIPTION OF PREFERRED EMBODIMENTS

Figure 1:
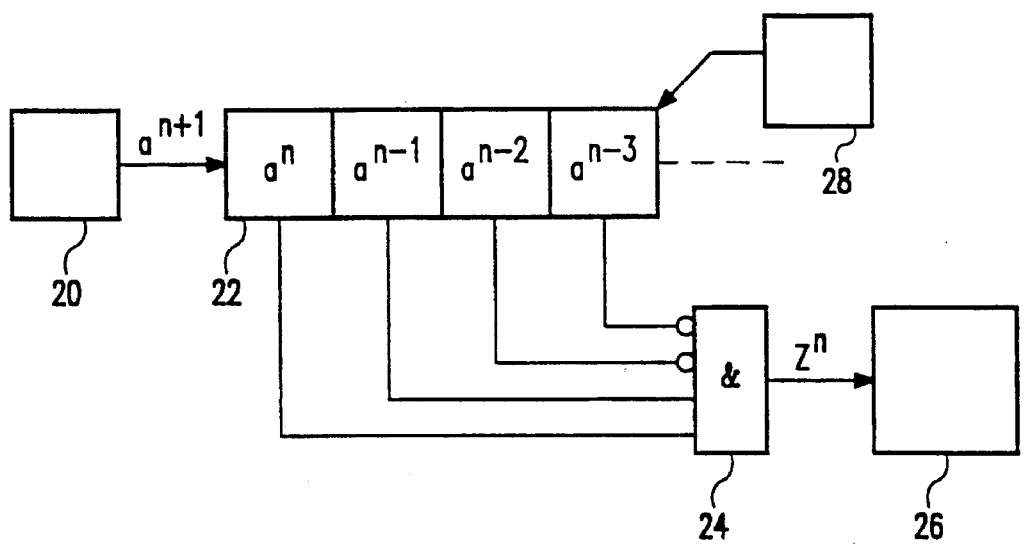
FIG. 1 shows a controller based on a shift register.

FIG. 1 shows a finite state machine realized as a particular circuit embodiment, and more in particular, as a controller based on a shift register 22, and operating as a detector for the input pattern 0011 arriving in sequence. The actuator signal is produced by a clock 28, in combination with an input bit stream generated by bit stream source device 20. Block 24 is a decoder executed as an AND-gate with two inverted inputs indicated by circles. Block 26 is a user device that needs the decoded output of shift register 22 through AND-gate 24. Any bit from the input stream exerts influence on the initial state as long as four clock cycles. Bits received earlier are no longer used. The circuit has 16 internal states, of which only one produces the output signal $Z^n=1$; the others all having $Z^n=0$. Various other realization types exist for such finite state machine: there may be more actuator inputs, such as in between two successive register stages, so that the output of a preceding stage is, e.g. ANDed or EXORed with such additional actuator input. Many other setups are feasible.

Figure 2:
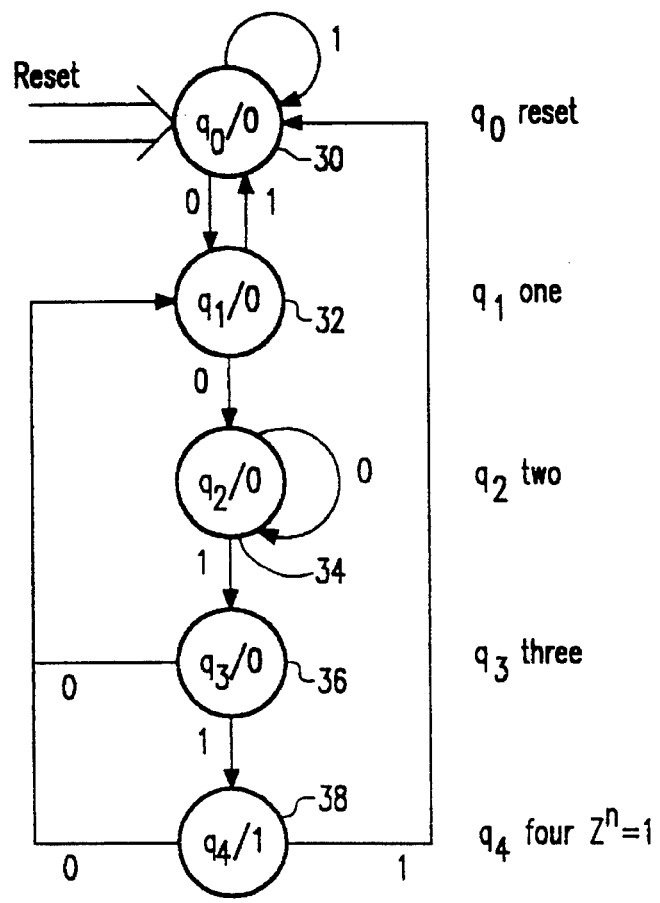
FIG. 2 shows the same reformatted as finite state machine.

FIG. 2 shows the same controller of FIG. 1 reformatted as finite state machine, but now having only five internal states. Here, the circuit detects whether the particular input combination leading to $Z^n=1$ is formed, or not. The four states q1–q4 (32, 34, 36, 38) indicate that the received input combination is correct for one, two, three, and four successive input bits, respectively. State q0 (30) is the wait state in which the circuit waits for detection of the first bit in sequence. This wait state can also be used as reset state. In this particular case, the reset actuator signal or command would then be a "dominant" command. Another activation of the reset state could be by a particular combination of input signals, or a particular sequence of combinations of input signals. Now, the arrows between the respective states indicate the transition realized under condition that the new bit received has the value indicated at the particular arrow. For example, after reception of two successive "0" bits, the system is in state q2 (34). If the next bit is a "1", this means that the first three bits of the pattern leading to $Z^n=1$ have been received, and the system goes to state q3 (36). If the next bit were a "0", however, the system remains in state q2, because the least recently received bit can no longer contribute to the pattern leading to $Z^n=1$. The other arrows derive analogously. The state diagram of FIG. 2 can straightforwardly be converted into a silicon realization. It should be noted, that each of states 30–38 may in fact represent various combinations of bits received, and thus relate to an associate respective equivalence class.

Figure 3:
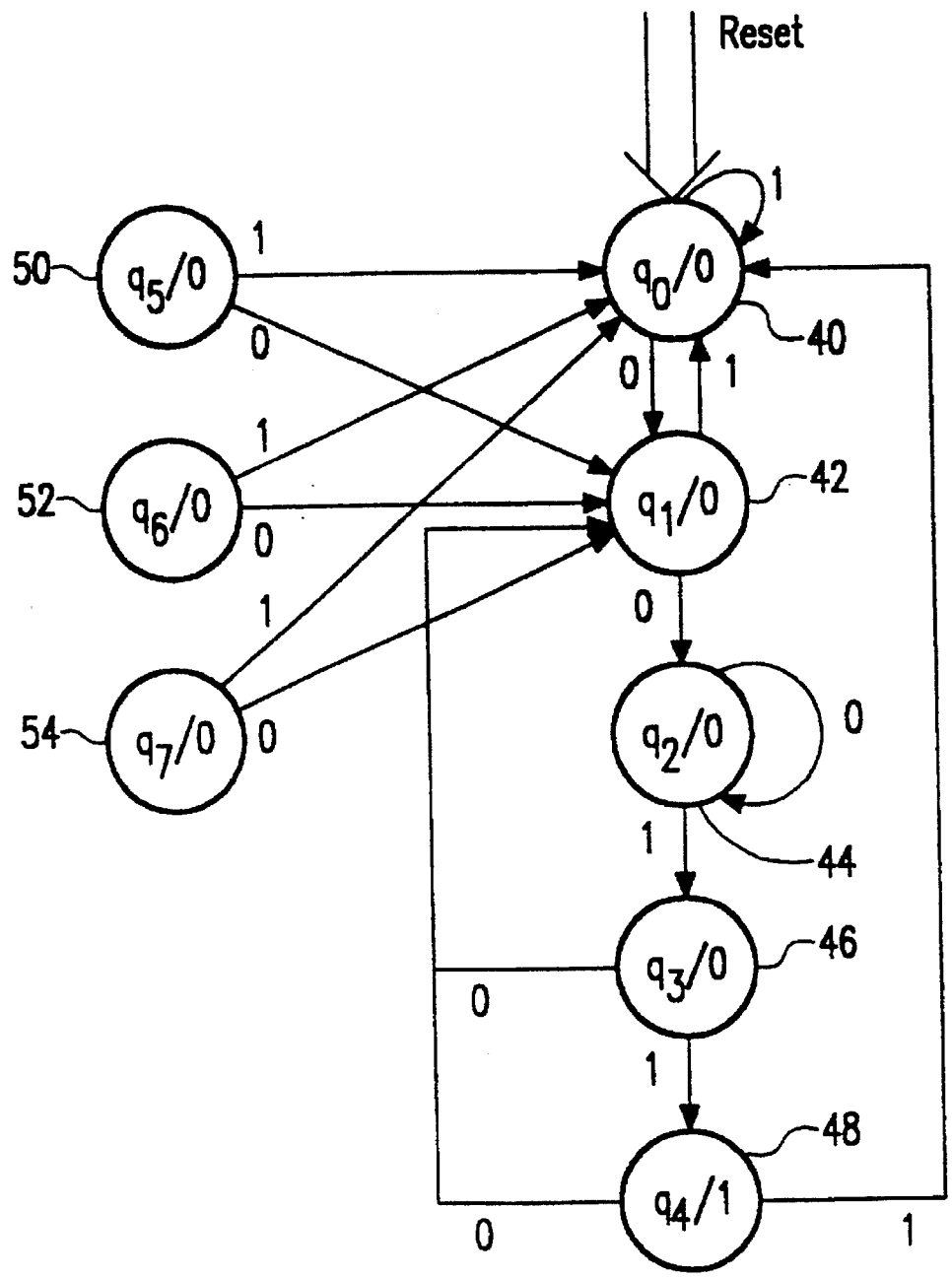
FIG. 3 shows a controller according to the invention.

FIG. 3 shows a controller according to the invention, realizing the same functionality as FIGS. 1, 2. Given the five states of FIG. 2, the hardware mapping would need at least three flipflops or bistables, leaving three redundant states. Mapping on tristables would need at least two elements, leaving four redundant states. In the remainder, only bistables are considered. The hardware states have been shown in FIG. 3. Now, first the "normal" states are revisited. State 40 corresponds to state 30 in FIG. 2 and is the reset state. States 42..48 correspond to states 32..38, respectively. States 50, 52, 54 have been amalgamated with state 40 to collectively emulate the reset state. This means that an actuation signal —0— will give a state transition to state 42. An actuation signal —1— (shorthand notation for a combination of a —1— bit plus a clock pulse) will give a state transition to state 40. This is only one of many solutions, because any other transition between the various equivalent states would fit as well, under the control of the —1— actuation signal. For example: state 40 could transit to 50, state 50 to 52, state 52 to 54, and state 54 again to state 40. Many other solutions would be feasible. The realization on a circuitry level is by means of standard logical gates and flipflops. Another realization would be by programmed or programmable logic array, combined with buffering that could be cointegrated with the array or external thereto. Now, in the way shown, states 40, 50, 52, 54 are fully equivalent. Another solution could be that state 54 were made equivalent to state 46 (actuation signal 1 would make it transit to state 48, actuation signal —0— still to state 42). An advantage could be less costly realization in hardware. A disadvantage could be the spurious realization of the output signal $Z^n$ shown in FIG. 1, because state 48 is the "last" state. In other types of finite state machines the prominence of such an ultimate state is less, offering a greater freedom. Of course, in FIG. 3, each of redundant states 50..54 could so be rendered equivalent to any of normally functional states 40..48. As stated earlier, some of states 40..48 could also be mutually equivalent in a realization for another purpose.

Now, the solution shown in FIG. 3 is faster than always upon entering a redundant state, first reverting to a separate reset state: the latter would need an additional clock pulse period as compared with FIG. 3: now the first actuator signal after coming into any of states 40, 50, 52, 54 may directly represent the first bit of the pattern to be recognized.

Figure 4:
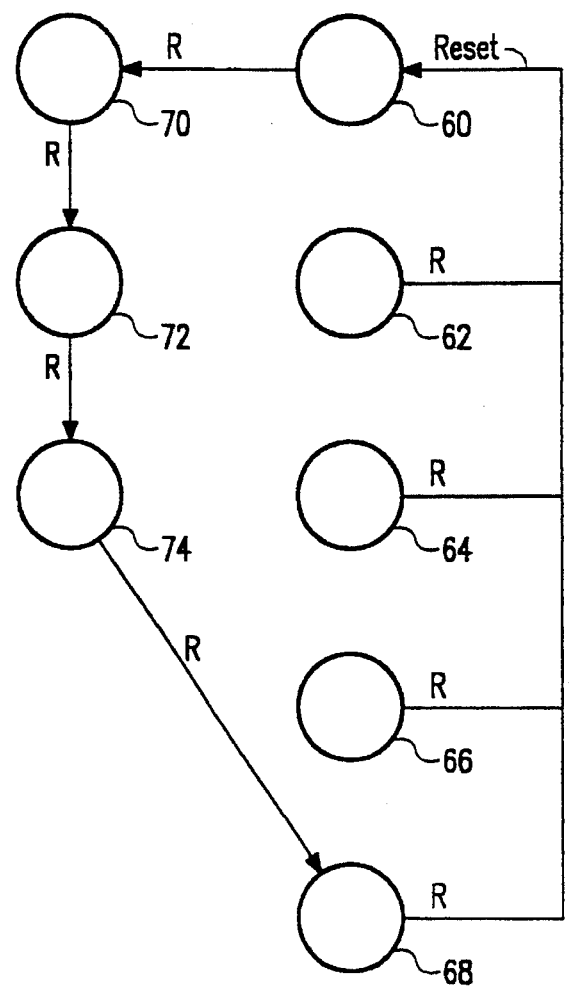
FIG. 4 shows a second embodiment of such controller.

FIG. 4 shows a reformatting of FIG. 3, the various actuation signals having been omitted. Only the "reset" actuation signal has been shown. States 60..68 correspond to states 40..48, respectively. States 70..74 correspond to redundant states 50..54 respectively. The "reset" actuation signal causes state 62, 64, 66, 68 to go to state 60. Further application of the reset signal will drive the machine successively through serially chained states 70, 72, 74, and hence to state 68. This arrangement renders the redundant states testable as follows:

first the intended bit pattern 0011 is applied, which leads to the generation of output signal $Z^n=1$ (cf. FIG. 1);

next, an actuator pattern —RRRRR— is applied, which again leads to the generation of output signal $Z^n=1$: the chain of redundant states is correct, if the reset generated $Z^n=1$-signal is spaced from its predecessor exactly five clock pulse cycles. Instead of the reset signal that by itself has a quite particular object, any other specific actuator signal or combination of signals or sequence of such combinations could be used for driving the finite state machine through the chain of redundant states. If there are more than one second subset of redundant states, these could be connected to a single chain for test reasons, or could be kept separately testable. The test signal proper ($Z^n=1$ in the set-up of FIG. 4) could be realized by any other appropriate detection means.

An additional counter-measure against noise is sometimes necessary. In fact, if the diagram of FIG. 2 is realized with three flipflops, a transition from state 32 to state 34 through interference would not be detected as such. A counter measure is the use of a single-bit-error detecting code, such as by including a parity flipflop or bit. This would increase the number of states from 8 to 16, and the number of redundant states from 3 to 11. In such situation, the objects and measures of the present invention become all the more valuable. Of course, code theory teaches even more sophisticated codes for higher degree of error protection, but often the decoding would become a tedious task itself.

Figure 5:
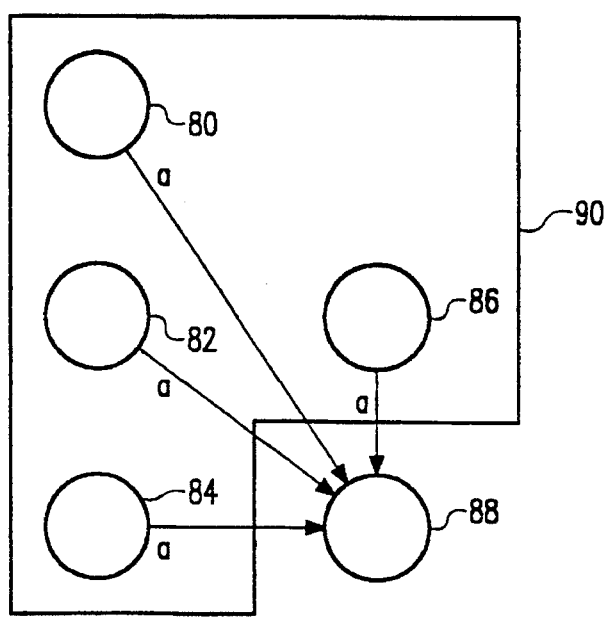
FIG. 5 illustrates the coding of the various states of a second subset as adjacent states.

FIG. 5 illustrates the coding of the various states of a second subset as adjacent states. The states 80..86 of subset 90 are all equivalent. Their states as mapped on a string of binaries are encoded according to:

00 . . .
01 . . .
10 . . .
11 . . . , respectively, the ranking of the actual code bits shown being irrelevant. The states have the other, non-specified bit(s) in common. Now, suppose the equivalence would mean that actuation signal or combination of actuation signals a would change all of these four states to state 88. This would mean that the next-state equation for state 88 were:

$$Q_x^{n+1}=(00yy+01yy+10yy+11yy).a+\ldots$$

Herein, + is logic OR, and yy are the other state defining bits common to states 80..86. This means that $$Q_x^{n+1}=yy.a+\ldots \quad (1)$$

the final term signals that state 88 could in principle also be reached from other states not shown. If now state 86 were the non-redundant state, the next state equation would be $$Q_x^{n+1}=00yy.a+\ldots \quad (2)$$

The simpler structure of equation (1) as compared with equation (2) generally renders implementing of the former more simple, and thus, less expensive. The adjacency of the coding reduces the bits differentiating between the equivalent states to don't care.

We claim:

1. A finite state machine having noise effect reduction, comprising:
   an actuator signal input;
   a plurality of sequential logic elements fed by said actuator signal input and being interconnected to realize a first set of interconnected logic states, each interconnection linking a predecessor state and a respective logic state, each respective logic state being selectively activated through combined occurrence of a respective predecessor state and an associated actuator signal received from said actuator signal input;
   a signal output fed by said logic elements, being under control of each member of at least a first subset of said logic states and outputting an output signal related to said first subset; and
   at least one second subset of logic states,
the member states of said at least one second subset being mutually equivalent with a particular state of said first subset linked by logical interconnections connecting all member states of said second subset and said particular state, collectively emulating a function of said particular state within said first subset.

2. A finite state machine as claimed in claim 1, wherein member states of said second subset are mutually equivalent with a reset state.

3. A finite state machine as claimed in claim 1, wherein member states of said second subset are encoded with an adjacent state assignment with one or more states in the first subset.

4. A finite state machine as claimed in claim 1, wherein member states of said second subset and said particular state are interconnected in a logical chain.

5. A finite state machine as claimed in claim 1, wherein the states of said first subset are encoded according to a code with error protection, further comprising detection means for detecting an occurrence of any of said member states of said second subset.

6. A finite state machine as claimed in claim 1, wherein said machine serves as a controller of a digital integrated circuit for realizing said output signal as a control signal.

7. A finite state machine having an input, comprising:
   a plurality of machine states, a tint subset of said machine states being obtainable by providing selected data sequences at the input, each member state of said first subset being related to a respective succeeding state, and a second subset of said machine states not being obtainable through providing said selected data sequences at the input; and
   a logical processor for detecting the occurrence of a member state of said second subset upon input of any of said selected data sequences, and upon detection, emulating a particular member state of said first subset to provide an equivalent respective succeeding state to that related to said particular member state.

8. The finite state machine according to claim 7, wherein member states of said second subset emulate a reset state of said first subset.

9. The finite state machine according to claim 7, wherein member states of said second subset are associated with a respective adjacent state of said first subset, and a member state of said second subset emulates said associated respective adjacent state.

10. The finite state machine according to claim 7, wherein member states of said second subset and said particular state are interconnected in a logical chain, said members states in said logical chain being entered into in sequential operations of the machine.

11. The finite state machine according to claim 7, wherein the member states of said first subset are encoded according to a code with error detecting capability, further comprising means for detecting an occurrence of a member states of said second subset based on said code.

12. The finite state machine according to claim 7, wherein the machine is a controller of a digital integrated circuit, and said first subset of states control functions of said digital integrated circuit.

\* \* \* \* \*